United States Patent
McCann et al.

[15] 3,647,115
[45] Mar. 7, 1972

[54] LIQUID-DISPENSING DEVICE WITH AUDIBLE ALARM

[72] Inventors: Gerald P. McCann, Glendale; Frank F. Chase, Glendora, both of Calif.

[73] Assignee: McCanns Engineering & Mfg. Co., Glendale, Calif.

[22] Filed: Mar. 12, 1970

[21] Appl. No.: 18,955

[52] U.S. Cl. ............................................. 222/39, 222/383
[51] Int. Cl. ............................................................. B67d 5/32
[58] Field of Search ...................... 222/23, 24, 27, 28, 36, 38, 222/39, 153, 341, 377, 383, 454–456

[56] References Cited

UNITED STATES PATENTS

| | | | |
|---|---|---|---|
| 1,539,071 | 5/1925 | Callahan et al. | 222/39 |
| 3,170,597 | 2/1965 | Reichenberger | 222/36 |
| 2,575,967 | 11/1951 | May | 222/39 |

FOREIGN PATENTS OR APPLICATIONS

| | | | |
|---|---|---|---|
| 375,860 | 4/1964 | Switzerland | 222/383 |

*Primary Examiner*—Samuel F. Coleman
*Attorney*—Lyon & Lyon

[57] ABSTRACT

There is disclosed herein a liquid-dispensing device for use with bottles and the like for dispensing measured amounts of liquid and providing a detectable signal indicating that such dispensing has taken place. The device is insertable into and lockable in a bottle. The device includes a positive displacement pump for dispensing a predetermined amount of liquid. A vibrator arrangement is provided for providing signals, the vibrator being actuated each time liquid is dispensed. Vibrations from the vibrator may be sensed in any suitable manner to provide a record of the number of times liquid is dispensed.

14 Claims, 4 Drawing Figures

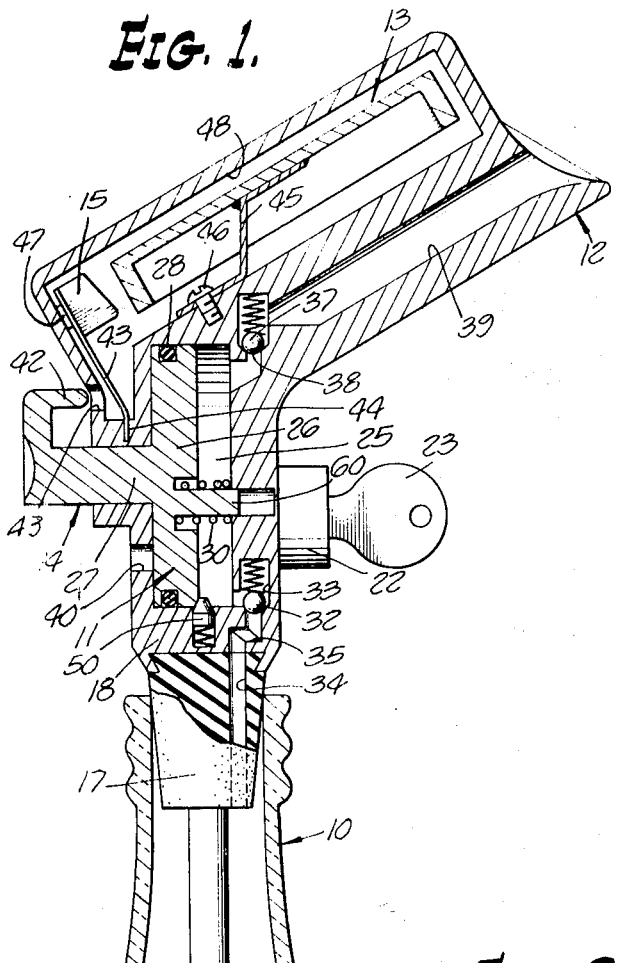
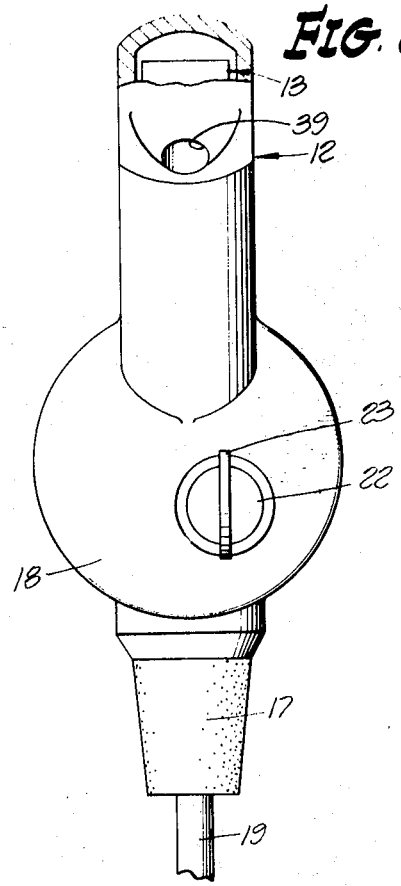
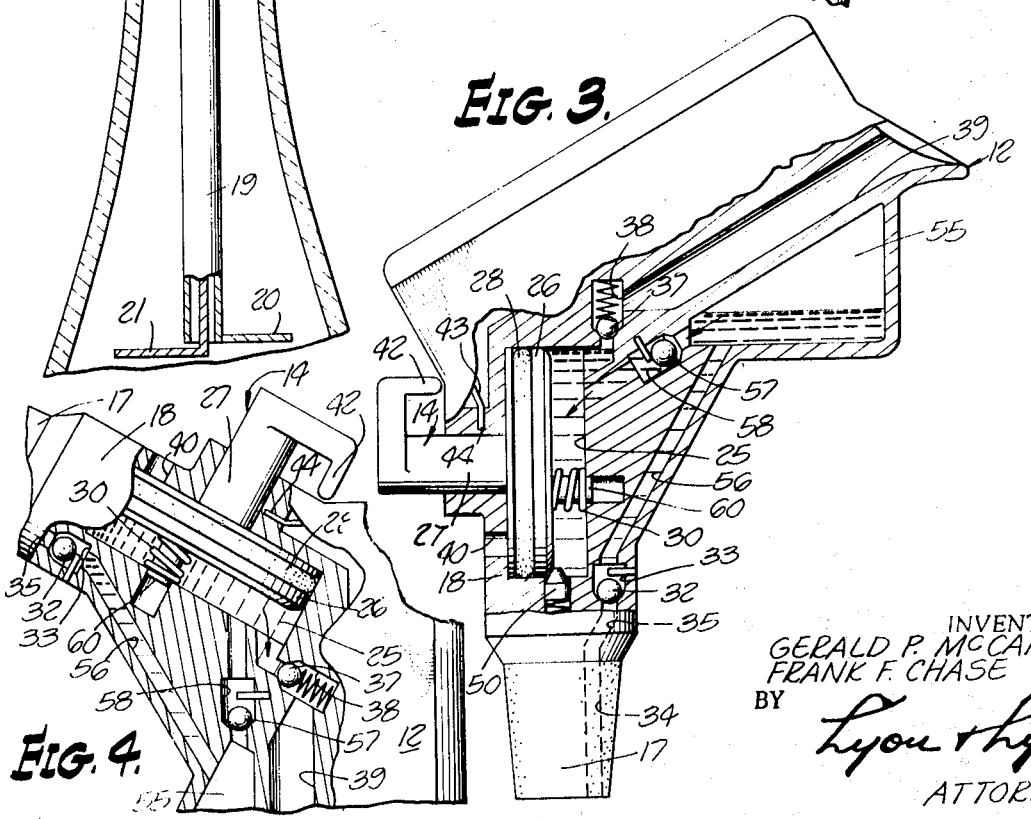
FIG. 1.
FIG. 2.
FIG. 3.
FIG. 4.
INVENTORS.
GERALD P. McCANN
FRANK F. CHASE
BY
Lyon & Lyon
ATTORNEYS

LIQUID-DISPENSING DEVICE WITH AUDIBLE ALARM

This invention relates to liquid-dispensing devices, and more particularly to such devices particularly useful in the dispensing of liquors and for providing a signal upon dispensing thereof.

There is an increasing desire to provide a suitable device for monitoring the dispensing of liquids from bulk containers. In particular, dispensing of liquors in bars and similar establishments is susceptible of abuse. Several approaches to counting or monitoring dispensing, such as described in U.S. Pat. Nos. 2,754,034, 2,883,086 and 3,170,597, have been made. The latter patent illustrates a liquid dispenser which may be attached to a bottle and which includes a radio transmitter for transmitting signals to a radio receiver and recorder. There are several factors which must be considered in providing such devices inasmuch as any given establishment may employ a large number of dispensing and monitoring devices and, thus, the size, weight and cost of each device must be within practical limits to enable the use thereof to be economical.

Accordingly, it is a principal object of the present invention to provide an improved liquid-dispensing device of relatively simple construction and which emits a detectable signal each time liquid is dispensed thereby.

It is an additional object of this invention to provide a device attachable to a bottle for dispensing liquid therefrom and which emits detectable vibrations upon dispensing of liquid.

A further object of this invention is to provide a liquid-dispensing device for dispensing predetermined amounts of liquid and providing a signal, such as subsonic, sonic or ultrasonic, each time such liquid id dispensed.

These and other objects and features of the present invention will become better understood through a consideration of the following description taken in conjunction with the drawing in which:

FIG. 1 is a cross-sectional view of a dispensing device constructed in accordance with the teachings of the present invention;

FIG. 2 is another view, partially in cross section, of the device shown in FIG. 1; and FIGS. 3 and 4 are cross-sectional views illustrating an alternative form of dispensing device employing a reservoir.

Turning now to the drawing, a dispensing device according to the present invention may be secured within the mouth of a bottle 10, and includes a positive displacement pump 11, pouring spout 12, and vibrator 13. An operator button 14 is provided for operating the pump 11, and for causing a hammer 15 to strike the vibrator 13.

Considering the device in more detail, a resilient plug 17 is provided for sealing the device with the mouth of the bottle 10. The plug 17 is affixed to the body 18 of the dispensing device. A tube 19 is secured to the body 18 and extends downwardly through the plug 17. A lock arm 20 is affixed to the lower end of the tube 19, and a rotatable lock arm 21 extends downwardly through the tube 19 and is operated by a keylock 22 in a conventional manner. As a key 23 is turned to a lock position, the arm 21 rotates to the position shown in FIG. 1 to prevent withdrawal of the dispensing unit from the bottle 10.

The body 18 includes a chamber 25 forming a cylinder for a piston 26. The cylinder 25 and piston 26 form the pump 11. An actuator arm 27 extends between the piston 26 and the operator button 14. An O-ring 28 is provided on the piston 26 to provide a suitable seal. The piston 26 is biased to the position shown in FIG. 1 by a spring 30.

Liquid is supplied to the pump by gravity through a check valve 32 mounted in a lower chamber 33. The plug 17 has an aperture 34 communicating with a passageway 35 in the body 18 so as to allow liquid to pass from the bottle 10 past the check valve 32 to the pump chamber 25 when the bottle and dispensing unit are tipped for pouring. In this manner, liquid from the bottle 10 flows by gravity past the check valve 32 into the pump chamber 25. An outlet check valve 37 is mounted in a chamber 38 and communicates between the pump chamber 25 and an outlet passageway 39 in the pouring spout 12. It will be apparent that depressing the button 14 moves the piston 25 to the right as seen in FIG. 1 thereby forcing the liquid from the pump chamber 25 past the check valve 37 and out the pouring spout 12. A venthole 40 is provided through the body 18 to vent the back side of the pump piston.

The button 14 includes an actuator or trip finger 42 which extends into an aperture 43 in the body 18 when the button 14 is depressed. The hammer 15 is mounted on a leaf spring 43 which is secured in the body 18 at 44. The vibrator 13 is secured to a resilient member 45 which in turn is secured to the body 18 at 46 by means of a screw fastener or the like. A shock pad 47 is provided behind the hammer 15. The vibrator 13 and hammer 15 are mounted within a cavity 48 in the body 18. As will be apparent to those skilled in the art, the body 18 can be made of two or more parts to facilitate assembly of the components of the dispensing device.

Depression of the button 14 causes the finger 42 to engage the spring 43 which in turn moves the hammer 15 into engagement with the vibrator 13. The vibrator 13 thus is struck by the hammer 15 and vibrates at a frequency depending upon the mass and mounting of the vibrator. The vibrations may be sensed or recorded in a variety of ways, such as by direct listening, by use of vibration and frequency sensitive relays, recorded on tape, sensed and rebroadcast, and so forth. Sensing arrangements such as those illustrated in U.S. Pat. No. 2,821,954 may be employed.

Different vibrators emitting different frequencies may be provided for different types of liquors, such as one frequency for bourbon, one frequency for gin, and so forth, thereby providing different frequencies for these different types of liquors. In a typical application, frequency selective receiving circuits can be employed to receive the vibrations from respective dispensing units so as to count or otherwise record the number of drinks dispensed.

In operation of the present dispensing device, the operator tilts the liquid container bottle 10 so as to cause the liquid to flow by gravity past the inlet check valve 32 into the pump chamber 25. The operator applies force on the button 14. This force is resisted by a detent 50 mounted in the body 18 such that the force-displacement curve has a decreasing characteristic. That is, the force applied by the operator must reach a predetermined minimum value in order to initiate the movement of the button 14. In the course of actuation, the force required to continue the actuation decreases from the predetermined minimum, thus producing a rapid motion. The actuation causes the liquid in the pump chamber 25 to flow past the outlet check valve 37 and to be dispensed from the pouring spout 12. The actuation simultaneously causes the hammer 15 to strike the vibrator 13 and the latter to vibrate. As noted above, the construction of the vibrator 13 may be different for different types of liquids. Thus, each time the predetermined amount of liquid is poured, the vibrator 13 is struck thereby providing a signal indicative of dispensing of one portion of the liquid. The vibrations may occur at any desired frequency throughout a wide frequency range including within the audible frequency spectrum.

FIGS. 3 and 4 illustrate an alternative dispensing unit employing a reservoir 55. Like components are numbered with similar reference numerals. The passageways 34 and 35 communicate through a ball check valve 32 to a passageway 56. The passageway 56 communicates with the reservoir 55, which in turn communicates through a ball check valve 57 in a chamber 58 with the pump chamber 25. When the unit is tipped for pouring, as seen in FIG. 4, the liquid is expelled by the pump 11 past the check valve 37 to the pouring spout 12 and, at the same time, liquid flows by gravity past the check valve 32 and through the passage 56 into the reservoir 55. When the unit is again moved to the upright position as seen in FIG. 3, liquid from the reservoir 55 flows into the pump cavity 25. This arrangement ensures that the pump chamber 25 is full of liquid at the start of each dispensing operation. Preferably, the reservoir 55 has a capacity greater than the pump chamber 25 to ensure complete refilling of the pump chamber when the bottle units are restored to the upright position. Thus, it will be apparent that the reservoir 55 is filled by gravity flow of the liquid in the tilted position, and the liquid is transferred to the pump chamber by gravity flow when the unit is restored to the upright position.

It should be noted that a shaft 60 which is affixed to the piston 26 may be mounted off center as seen in FIGS. 1 and 3 so as to prevent the piston 26 and actuator button 14 from rotating to an inoperative position. Alternatively, the trip finger 42 can be made longer and always extend at least partially within the opening 43 so as to maintain alignment of the finger and ensure actuation of the hammer 15. Alternate striking arrangements may be employed for the hammer 15, such as a trip linkage which causes the hammer to quickly strike and quickly release its contact with the vibrator 13 upon depression of the button 14.

The present embodiments of this invention are to be considered in all respects as illustrative and not restrictive.

What is claimed is:

1. A relatively portable liquid-dispensing device for dispensing predetermined amounts of liquid from a container, such as a bottle of liquid, and providing a signal indicative thereof comprising body means having a coupling portion for coupling the body means with a container in an essentially fluidtight relationship and to provide a manually transportable and tippable assembly, said body means having an inlet passage for communication with said container and an outlet passage for communication with a pouring spout, check valves respectively mounted in said inlet and outlet passages, pump means mounted in said body means and including a fluid chamber communicating with said inlet and outlet passages, said pump means including a piston in said chamber for forcing liquid from said chamber through said outlet check valve, said chamber being filled by gravity flow of liquid through said inlet check valve by tipping said device to a predetermined position, actuator means for said pump means for moving the piston thereof, said actuator means including a trip member, and mechanical vibrator means coupled with said body means for actuation by said trip member, said vibrator means comprising a vibrator and hammer means for striking said vibrator, said hammer means being actuated by said trip member upon movement of said actuator means to operate said piston.

2. A device as in claim 1 including detent means coupled with said body means and engaging said piston, said detent means cooperating with said piston to establish a predetermined minimum force to actuate said piston by said actuator means.

3. A device as in claim 2 wherein said detent means comprises a spring-biased detent for engaging a surface of said piston whereby said piston must depress said detent during the initial movement of said piston.

4. A device as in claim 1 including locking means coupled with said body means and extending from said device and into said container for preventing removal of said device from said container.

5. A liquid-dispensing device for dispensing predetermined amounts of liquid from a container and providing a signal indicative thereof comprising body means having a coupling portion for coupling the body means with a container in an essentially fluidtight relationship, said body means having an inlet passage for communicating with said container and an outlet passage for communication with a pouring spout, check valves respectively mounted in said inlet and outlet passages, pump means mounted in said body means and including a fluid chamber communicating with said inlet and outlet passages, said pump means including a piston in said chamber for forcing liquid from said chamber through said outlet check valve, said chamber being filled by gravity flow of liquid through said inlet check valve by moving said device to a predetermined position, said body means including a resevoir, a passage communicating with said inlet check valve and said resevoir, and a resevoir outlet check valve communicating between the resevoir and said fluid chamber, said resevoir serving to insure filling of said fluid chamber prior to dispensing to liquid therefrom, actuator means for said pump means for moving the piston thereof, said actuator means including a trip member, and mechanical vibrator means coupled with said body means for actuation by said trip member, said vibrator means comprising a vibrator and hammer means for striking said vibrator, said hammer means being actuated by said trip member upon movement of said actuator means to operate said piston.

6. A device as in claim 11 including detent means coupled with said body means and engaging said piston, said detent means cooperating with said piston to establish a predetermined minimum force to actuate said piston by said actuator means, and locking means coupled with said body means and extending from said device and into said container for preventing removal of said device from said container.

7. A relatively portable liquid-dispensing device for dispensing a predetermined amount of liquid from a container and providing a signal indicative thereof comprising body means having a coupling portion for coupling the body means with a container in an essentially fluidtight relationship and to provide a manually transportable and tippable assembly, said body means having an inlet passage for communication with said container and having an outlet passage for communication with a pouring spout, said body means having a chamber and a cavity therein, piston means mounted in the chamber in said body means and forming a pump to expel liquid from said chamber and through said outlet passage, said chamber being filled by gravity flow of liquid through said inlet passage by tipping said device to a predetermined position, actuator means for said piston for moving the piston to force liquid from said chamber, said actuator means including a trip member, and mechanical vibrator means mounted in said cavity in said body means for actuation by said trip member upon movement of said actuator means to operate said piston.

8. A device as in claim 7 wherein said vibrator means includes hammer means interposed between said trip member and a vibrator, said hammer means serving to strike said vibrator upon predetermined movement of said actuator means.

9. A device as in claim 7 including detent means normally engaging said piston, said detent means cooperating with said piston to establish a predetermined minimum force required to move said piston by said actuator means.

10. A device as in claim 9 wherein said detent means comprises a detent mounted in said body means for engaging a surface of said piston whereby said piston must depress said detent during the initial movement of said piston, and locking means coupled with said body means for locking said device in said container.

11. A portable liquid-dispensing device for dispensing predetermined amounts of liquid from a container and the like, such as a conventional liquor bottle, and providing a detectable signal indicative thereof comprising body means having a coupling portion for coupling the body means with a container in an essentially fluidtight relationship to enable the combined assembly of the dispensing device and container to be readily transported and tipped by hand for dispensing liquid, said body means having an inlet passage for communication with said container and an outlet passage communicating with a pouring spout, pump means disposed in said body means and including a fluid chamber communicating with said inlet and outlet passages, said fluid chamber being fillable from said container through said inlet passage upon predetermined tipping of the combined assembly of said dispensing device and container, check valve means mounted in said outlet passage, and said pump means including a piston in said fluid chamber for forcing liquid from said chamber through said outlet check valve after said chamber is filled with liquid from said container by gravity flow of liquid into said chamber upon tipping of said dispensing device, actuator means for said pump means for moving the piston thereof to enable dispensing of liquid from said chamber through said outlet passage only upon actuation of said actuator means, said actuator means including a trip member, and mechanical vibrator means coupled with said body means for actuation by said trip member upon movement of said piston in dispensing liquid from said fluid chamber, said vibrator means comprising a vibrator and hammer means for striking said vibrator, said hammer means being actuated by said trip member upon movement of said actuator means to operate said piston.

12. A device as in claim 11 including check valve means mounted in said inlet passage for preventing flow of liquid from said fluid chamber back into said container, and locking means comprising a pair of relatively angularly displaceable arm means extending from said device and for extending into a container for preventing removal of said device from a container.

13. A device as in claim 11 wherein, said body mean includes a central portion having said fluid chamber therein and an angularly depending portion forming said pouring spout, said outlet passage communicating between said fluid chamber and said pouring spout, said depending portion having a cavity therein separate from said spout within which said vibrator is resiliently mounted, and said actuator means comprises an actuator button coupled with said piston, and includes a finger extending into said cavity of the depending portion of said body for causing said hammer means to strike said vibrator upon depression of actuator.

14. A device as in claim 11 including detent means mounted in said body means and extending into said fluid chamber therein, said detent means engaging said piston upon depression of said actuator means to establish a predetermined minimum force to actuate said piston by said actuator means.

* * * * *